United States Patent
Yang et al.

(10) Patent No.: US 11,568,012 B2
(45) Date of Patent: Jan. 31, 2023

(54) METHOD AND SYSTEM FOR ANALYZING EDUCATIONAL BIG DATA ON BASIS OF MAPS

(71) Applicant: CENTRAL CHINA NORMAL UNIVERSITY, Hubei (CN)

(72) Inventors: Zongkai Yang, Hubei (CN); Sannyuya Liu, Hubei (CN); Dongbo Zhou, Hubei (CN); Jianwen Sun, Hubei (CN); Jiangbo Shu, Hubei (CN); Hao Li, Hubei (CN)

(73) Assignee: CENTRAL CHINA NORMAL UNIVERSITY, Hubei (CN)

( * ) Notice: Subject to any disclaimer, the term of this patent is extended or adjusted under 35 U.S.C. 154(b) by 117 days.

(21) Appl. No.: 16/605,806

(22) PCT Filed: May 8, 2018

(86) PCT No.: PCT/CN2018/085953
§ 371 (c)(1),
(2) Date: Oct. 17, 2019

(87) PCT Pub. No.: WO2019/184052
PCT Pub. Date: Oct. 3, 2019

(65) Prior Publication Data
US 2020/0125618 A1    Apr. 23, 2020

(30) Foreign Application Priority Data
Mar. 29, 2018    (CN) .......................... 201810271939.X

(51) Int. Cl.
*G06F 16/00* (2019.01)
*G06F 16/9537* (2019.01)
(Continued)

(52) U.S. Cl.
CPC ...... *G06F 16/9537* (2019.01); *G06F 16/9535* (2019.01); *G09B 5/12* (2013.01)

(58) Field of Classification Search
CPC .. G06F 16/9537; G06F 16/9535; G06F 16/29; G09B 5/12; G06Q 10/0637; G06Q 50/205; G06Q 10/0631; G06Q 10/0639
(Continued)

(56) References Cited

U.S. PATENT DOCUMENTS

| 2013/0073387 A1* | 3/2013 | Heath | G06Q 30/02 705/14.53 |
| 2014/0205991 A1* | 7/2014 | Xu | G09B 5/125 434/362 |
| 2017/0316528 A1* | 11/2017 | Willcox | G09B 5/00 |

FOREIGN PATENT DOCUMENTS

| CN | 103605706 | | 2/2014 | |
| CN | 103605706 A | * | 2/2014 | ......... G06F 16/9535 |
| CN | 106205248 | | 12/2016 | |

OTHER PUBLICATIONS

"International Search Report (Form PCT/ISA/210) of PCT/CN2018/085953," dated Jan. 3, 2019, with English translation thereof, pp. 1-4.

* cited by examiner

*Primary Examiner* — Irete F Ehichioya
*Assistant Examiner* — Shirley D Hicks

(57) ABSTRACT

The disclosure discloses a method for analyzing educational big data on the basis of maps. The method includes acquiring educational resource data and storing the educational resource data into databases according to certain data structures; constructing theme map layers for each analysis theme, classifying and indexing data according to the analysis themes, and superimposing the theme map layers onto base maps to form data maps; analyzing data of the theme (Continued)

map layers according to the analysis themes and acquiring theme analysis results; extracting the data of the multiple theme map layers in target regions, fusing the data and acquiring region analysis results; acquiring learning preference of users; combining the learning preference of the users according to content of user requests and searching the region analysis results in response to the user requests. The disclosure further discloses a system for analyzing the educational big data on the basis of the maps.

20 Claims, 3 Drawing Sheets

(51) Int. Cl.
*G06F 16/9535* (2019.01)
*G09B 5/12* (2006.01)

(58) Field of Classification Search
USPC .................................................. 707/600–899
See application file for complete search history.

METHOD AND SYSTEM FOR ANALYZING EDUCATIONAL BIG DATA ON BASIS OF MAPS

CROSS-REFERENCE TO RELATED APPLICATION

This application is a 371 of international application of PCT application serial no. PCT/CN2018/085953, filed on May 8, 2018, which claims the priority benefits of China Application No. 201810271939.X, filed on Mar. 29, 2018. The entirety of each of the above-mentioned patent applications is hereby incorporated by reference herein and made a part of this specification.

BACKGROUND

Technical Field

The disclosure belongs to a cross-technical field of cognitive subjects and educational subjects, and more specifically, the disclosure relates to a method and a system for analyzing educational big data on the basis of maps.

Description of Related Art

Educational big data develops rapidly, and research on data processing, information mining, and application services around the educational big data has also become a series of research hotspots. Efficient and accurate representation of various educational data can be achieved through visual methods. Reproduction of educational phenomena can be accomplished, so that educational information mining can be performed. Moreover, how services can be provided to the education management departments and how individualized learning guidance can be satisfied have become hotspots for scholars in cognitive science, psychology, and education. In recent years, numerous typical big data applications have emerged in the field of education, such as learning analysis, behavior files, and ability assessment in the field of teaching information as well as personalized services, teaching and research supports, policy supports, etc. in the field of education management information. The development of educational big data prosperous.

The educational big data can be applied in the following areas: first, educational big data applications for student management. Such application is often referred to as the smart grid and grid management application. Such application focuses on all aspects of high school student management. Companion counseling is provided to cultivate the trajectory and development process of life, studies, and thoughts in the whole life cycle of students, and a new model of collaborative and sustainable intelligence management and guiding development is formed. Next, the educational big data application for campus services is provided. In such application, campus public opinion is monitored and campus resource allocation is optimized mainly through crawling and analyzing all kinds of data on campus in real time. In this way, the allocation of campus resources is optimized, construction management policies are provided for the school, and humane care of the schools is demonstrated. The educational big data application for teaching and research is then provided. Some high schools began to perform data analysis based on teaching resources according to the various professional enrollment plans, course plan of this year, and teaching arrangements of previous years and provide predictions and warnings on various resources in teaching activities. Some other high schools are exploring establishment of multidimensional data analysis services for high school research indicators through introducing and aggregating various types of research raw data and accurately find external talents who may greatly satisfy school needs.

Therefore, an accurate analysis of the educational big data is essential. The educational data itself is not only required to be analyzed by using big data, but other aspects of data information are required to be combined. For instance, the educational big data may be integrated with age information to obtain an age distribution trend of educational data information, and educational resources are allocated according to this trend. Alternatively, the educational big data is combined with regional information to obtain educational resource distribution in different regions. Alternatively, the educational big data may be combined with other types of information.

SUMMARY

According to the above technical defects or improvement requirements of the related art, the disclosure provides a method and a system for analyzing educational big data on the basis of maps. According to the technical scheme, the method and the system have the advantages that the educational data are classified and are analyzed according to different theme requirements, accordingly, parts of the problems of existing complicated educational data and relative deficiency of accurate analysis can be solved, and the educational data can be utilized and analyzed.

To realize the above purpose, according to one aspect of the disclosure, a method for analyzing educational big data on the basis of maps is provided, and the method includes the following steps.

S1: Educational resource data is acquired and classified and the educational resource data is stored into databases according to certain data structures.

S2: Geotags of data is acquired, theme map layers for each analysis theme are constructed, the data is classified and indexed according to the analysis themes, the data is loaded to the corresponding theme map layers, and the theme map layers are superimposed onto base maps to form data maps.

S3: Data of the theme map layers is analyzed according to the analysis themes, and theme analysis results are acquired. The data of the multiple theme map layers in target regions is extracted according to the geotags of the data, the data is fused, and region analysis results are acquired.

S4: Users are analyzed according to learning time sequences and/or learning paths, and learning preference of the users are acquired.

S5: The learning preference of the users is combined according to content of user requests, the region analysis results are searched in response to the user requests, and request results are presented on the maps.

As a preferred embodiment of the technical solution of the disclosure, step S2 includes the following.

S21: The geotags of the data are acquired and geographical forms and/or locations are clearly defined according to the geotags.

S22: Theme indexes are established according to analysis themes and the data is loaded to different theme map layers through the indexes.

S23: A visual property and/or a symbol pattern are configured and loaded for each theme layer and the data maps are formed.

As a preferred embodiment of the technical solution of the disclosure, step S3 includes the following.

S31: The theme map layers are loaded to the base maps for visual presentation, a plurality of sub map layers of the theme map layers are created according to time sequence nodes, observation timelines are configured to control visual properties of the sub map layers, and the theme analysis results are acquired of the theme map layers.

S32: The base maps are loaded, target data is mapped into the base maps according to geographic coordinates, all data within a boundary range is acquired and classified according to the boundary range of the current target data, and data matched with the target data is filtered, and the data is displayed on the maps.

S33: An educational map is divided into a plurality of learning units, data of each learning unit is loaded, learning data of each user in the current learning unit is counted, a single analysis or a cross analysis is performed according to data categories, and learning evaluation is performed according to analysis results.

S34: The theme map layers are fused to accomplish information extraction of the multiple theme map layers, data information of the target regions on different theme map layers are acquired and fused at a same time, the fused data is analyzed in the target regions, and analysis results of the target regions are obtained.

S35: A buffer region is determined by utilizing geographic coordinates of the target data, data query of different theme map layers for the buffer region is performed, a space relationship between target data and different theme map layers is established, a space and time relationship between target data and different theme map layer data is determined according to time sequence changes.

As a preferred embodiment of the technical solution of the disclosure, step S4 includes the following.

S41: A time sequence analysis of learning resources and learning effects is performed according to the geotags of the data, and learning resource evaluation results are acquired.

S42: A path analysis of the learning paths and/or learning resources is performed, and learning path features are obtained.

S43: At least one learning path is generated and planned, and/or the learning resources are generated and recommended according to the learning path features and/or the learning resource evaluation results.

S44: Real-time learning path planning and/or learning resource recommendation are/is sorted by combining a real-time location and a time sequence status of the user according to personalized selection of the user.

As a preferred embodiment of the technical solution of the disclosure, step S5 includes the following.

S51: user requests are parsed and accessible theme map layers and data are extracted according to users' access rights and locations from which the requests are made.

S52: The theme map layers and data are searched and matched in combination with access request content, and matching results are visualized on the maps.

To realize the above purpose, according to one aspect of the disclosure, a system for analyzing educational big data on the basis of maps is provided, and the system includes the following: a data acquiring module, configured to acquire and classify educational resource data and store the educational resource data into databases according to certain data structures; a map constructing module, configured to acquire geotags of data, construct theme map layers for each analysis theme, classify and index the data according to the analysis themes, load the data to the corresponding theme map layers, and superimpose the theme map layers onto base maps to form data maps; a resource correlation module, configured to analyze data of the theme map layers according to the analysis themes and acquire theme analysis results; to extract the data of the multiple theme map layers in target regions according to the geotags of the data, fuse the data, and acquire region analysis results; a resource recommendation module, configured to analyze users according to learning time sequences and/or learning paths and acquire learning preference of the users; and a user access module, configured to combine the learning preference of the users according to content of user requests, search the region analysis results in response to the user requests, and present request results on the maps.

As a preferred embodiment of the technical solution of the disclosure, the map constructing module includes the following: a geotag module, configured to acquire the geotags of the data and clearly define geographical forms and/or locations according to the geotags; a theme indexing module, configured to establish theme indexes according to analysis themes and load the data to different theme map layers through the indexes; and a map visualization module, configured to configure and load a visual property and/or a symbol pattern for each theme layer and form the data maps.

As a preferred embodiment of the technical solution of the disclosure, the resource correlation module includes the following: a map layer analysis module, configured to load the theme map layers to the base maps for visual presentation, create a plurality of sub map layers of the theme map layers according to time sequence nodes, configure observation timelines to control visual properties of the sub map layers, and acquire the theme analysis results of the theme map layers; a boundary filtering module, configured to load the base maps, map target data into the base maps according to geographic coordinates, acquire and classify all data within a boundary range according to the boundary range of the current target data, and filter data matched with the target data and display the data on the maps; a unit evaluation module, configured to divide an educational map into a plurality of learning units, load data of each learning unit, count learning data of each user in the current learning unit, perform a single analysis or a cross analysis according to data categories, and perform learning evaluation according to analysis results; a map layer fusing module, configured to fuse the theme map layers to accomplish information extraction of the multiple theme map layers, acquire and fuse data information of the target regions on different theme map layers at a same time, analyze the fused data in the target regions, and obtain analysis results of the target regions; and a correlation analysis module, configured to determine a buffer region by utilizing geographic coordinates of the target data, perform data query of different theme map layers for the buffer region, establish a space relationship between target data and different theme map layers, determine a space and time relationship between target data and different theme map layer data according to time sequence changes.

As a preferred embodiment of the technical solution of the disclosure, the resource recommendation module includes the following: a time sequence analysis module, configured to perform a time sequence analysis of learning resources and learning effects according to the geotags of the data and acquire learning resource evaluation results; a path analysis module, configured to perform a path analysis of the learning paths and/or learning resources and acquire learning path features; a resource evaluation module, configured to generate and plan for at least one learning path and/or generate and recommend the learning resources according to the learning path features and/or the learning resource evaluation results; and an intelligence learning guidance module, configured to sort real-time learning path planning and/or learning resource recommendation by combining a real-time location and a time sequence status of the user according to personalized selection of the user.

As a preferred embodiment of the technical solution of the disclosure, the user access module includes the following: a data parsing module, configured to pars user requests and extract accessible theme map layers and data according to users' access rights and locations from which the requests are made; and a resource matching module, configured to search and match the theme map layers and data in combination with access request content and visualize matching results on the maps.

In general, the above technical solutions provided by the disclosure have the following beneficial effects compared with the related art.

(1) The method of the technical solutions of the disclosure begins with integration of multiple subjects. Guided by the basic theories of cartography and visual analysis, a new way of displaying big data, information extraction mode, and service method are explored. As such, effective methods and tools are provided for comprehensive application of the educational big data and the specific service landing.

(2) In the method provided by the technical solutions of the disclosure, the method of map visual analysis is introduced into the management, analysis, and application of the educational big data. In this way, the application models and analysis methods of the educational big data are increased, so that the educational big data is to be accurately analyzed and utilized.

(3) In the technical solutions of the disclosure, a method of combining the map visual analysis and educational big data is provided. Further, the map visual analysis method is fused with educational policy-making, education management, educational applications, learning supports, and learning personalized services, and the application gap is thereby filled.

(4) In the technical solutions of the disclosure, data analysis modes are set for different users. Moreover, multilayer structures are configured for different themes, and data fusion to a certain extent is provided between different data layers while the different data layers are ensured to be independent from one another. Accuracy of educational big data analysis for specific themes is improved, relevance of different themes is improved, and the effects of the educational big data are fully utilized.

DESCRIPTION OF THE EMBODIMENTS

To better illustrate the goal, technical solutions, and advantages of the disclosure, the following embodiments accompanied with drawings are provided so that the disclosure are further described in detail. It should be understood that the specific embodiments described herein serve to explain the disclosure merely and are not used to limit the disclosure. In addition, the technical features involved in the various embodiments of the disclosure described below can be combined with each other as long as the technical features do not conflict with each other. The disclosure is further described in detail in combination with specific embodiments.

Figure 1:
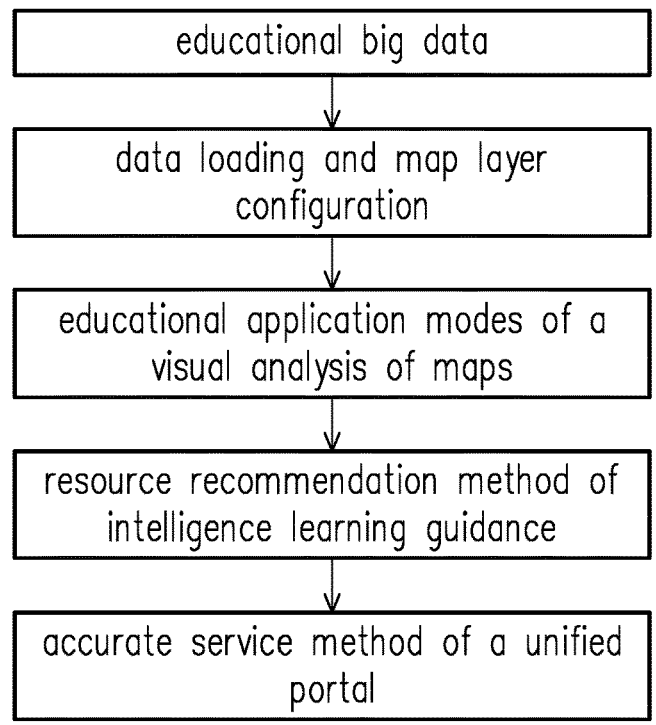
FIG. 1 is a flow chart of a visual analysis and service method according to an embodiment of the disclosure.

As shown in FIG. 1, a mode and a method for educational big data visual analysis applications and services on the basis of maps provided by the embodiments of the disclosure includes the following steps:

(1) Educational big data is acquired. Educational resource data such as data related to education management, data related to education levels, data related to education resources, and individual learning data are acquired through connecting with existing educational management institutions, educational units, and online learning platforms. In a specific classification, the educational resource data may be divided into teaching resources and learning resources. These pieces of data constitute the educational resource data, and through classifying and analyzing the data, the data can be used to perform a visual analysis of education management and decision-making information and to perform a visual analysis of personalized learning data. Specifically, acquisition and organization of the educational big data includes management of existing electronic version data. Herein, text format data is included, such as report data in the excel format. These pieces of data are planned and organized, and educational management data in a database format is formed.

In a preferred embodiment, the educational big data at least includes teaching resource data and learning resource data. The teaching resource data includes: school information, that is, the school profile, faculty, students, classes, academic affairs, equipment, laboratories, etc. as well as related government information, that is, overview of educational administration, district schools, input on funding, policy, documents, etc. The learning resource data includes: course data, course resource data, student personal information, selected course status data, learning behavior data, learning assessment, evaluation data, etc.

In this embodiment, different pre-processing is preferably performed to data from different sources, and processed data is stored into databases according to a certain structure. For instance, the teaching resource data and the learning resource data are separately processed. In this embodiment, a PostgreSQL database and a MongoDB organization are preferably used for a database storage structure to build a storage system. Herein, the PostgreSQL is configured to store spatial data and relational data, and the MongoDB is configured to store non-relational data, that is, NO-SQL data, and such data specifically includes course resource content such as course videos, voices, courseware, exercises, etc.

(2) Geotags for educational data are generated. The data is layered, geographical forms of the data are defined, theme indexes are built according to analysis themes, and corresponding map layers are formed and loaded. That is to say, a geotag may be built for each educational data through methods such as location property, place name service, and map mapping of the data, so that data integration based on locations is accomplished. Based on the above, education, teaching management data, and the teaching resource data may be further loaded, and learning status data and the like may be personalized, so that multi-mode data fusion management of text data, audio data, image data, and the like is accomplished. According to different application needs, a corresponding theme analysis map layer set may be established for each type of the needs, so that theme-based content refactoring is accomplished. Moreover, a map layer according to each of the themes is created, and data corresponding to the map layer is loaded. In this embodiment, the theme map layers are preferably to be correspondingly loaded onto base maps (e.g., static maps) according to the geotags of the data. Preferably, if a plurality of data sets are provided for the same theme, a time sequence data set is built. That is, the plurality of data sets are arranged according to the time sequence. Further, maps are layered based on different types of data, and map layer properties and map layer patterns are configured.

Figure 2:
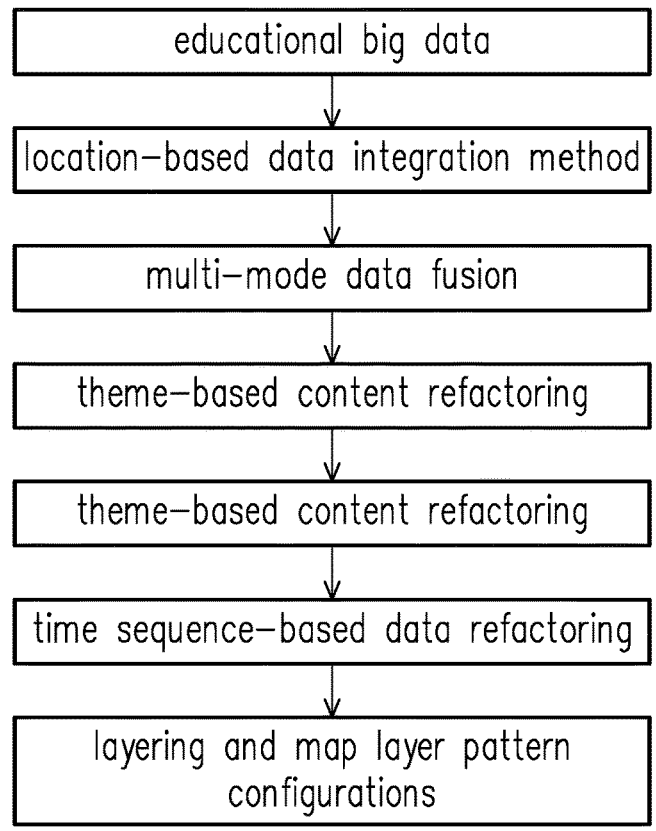
FIG. 2 is a flow chart of configuration of data loading and theme map layers according to an embodiment of the disclosure.

As shown in FIG. 2, the following steps are included in step (2).

(2-1) Geotags of the educational big data are acquired. In this embodiment, an education data geotag method for educational big data is preferably built, geospatial algorithm for data is established, so that calculation of geographic locations of the education data is accomplished, and geographic coordinates for each piece of the education data are generated.

Specifically, in this embodiment, geotags for the existing education data are preferably generated in three categories.

In the first category, for data obtained through the collection function of application software itself such as an online learning system and a mobile learning system, location coordinates at the time of learning can be obtained when collection is performed. For instance, a GPS location at the time of learning may be obtained by using GPS in the mobile learning system, or a location may be determined through an IP address in the online learning system. The disclosure is based on the assumption that a student or a user is learning at his or her actual location, and the situation of false locations is not to be considered.

In the second category, the geotags of the data is acquired by applying a method of parsing place names. Text related to the place names in the data is obtained by applying a method of text analysis. Text related to the place names is obtained through an object to which the data is attached, and place name parsing of open map place name services such as Baidu Maps API and Google Maps API is applied, so that corresponding geographic coordinates corresponding to the place names are obtained, and geotags are generated.

In the third category, the geographic coordinates are generated through using a method of knowledge map mapping, hierarchical information of application knowledge is adopted, map mapping is established, and a mapped geographic location of the data is obtained according to knowledge units. That is, the map mapping is established for the hierarchical information of the application knowledge of the educational big data, and a mapped geographic position is obtained through the knowledge units, that is, a determined location of one piece of knowledge determined to be mapped. Note that when the map mapping method is used, when the maps are generated by adopting different rules, different geographic locations may be generated by the same knowledge unit. As such, when applications are applied, the mapping rules have to be unified, so that it is ensured that a unique location is obtained when different applications are applied.

(2-2) The data having the geotags is layered, and the geographical forms of the data are defined. In this embodiment, a location-based data integration algorithm is prefer-ably established, integration of the educational management data, the teaching resource data, and personalized learning data is accomplished, and different data layers are configured and stored to the databases. Specifically, after all data acquires the geotags thereof, the geotags are required to be layered. That is, the geographical forms of the data are defined. That is, point data, line data, and face data in the geospatial space are defined, and corresponding forms thereof are generated. Different types of processing are performed for data of different categories. For instance, in this embodiment, the following processing methods may be adopted respectively for the teaching resource data and the learning resource data.

Teaching Resource Data: a data unit similar to an administrative district level is established, that is, a smallest administrative unit, such as a certain school or a certain class and is expressed in the form of a point, and an upper administrative unit is expressed in the form of a plane. As regards the administrative management unit of each level and each type, in the specification, map services open to the public such as Baidu Maps and the like are adopted, so as to obtain location information and a boundary polygon of an object. A central point location of a map object and a boundary of the object are recorded in the map object, such as a range polygon of a school, a polygon of an administrative district, and the like.

Learning Resource Data: the data of each location is recorded and is expressed by a data point, and a continuous learning process is expressed by a line.

(2-3) The theme indexes are built according to the analysis themes, corresponding map layers are generated, and data corresponding to the map layers is loaded. In this embodiment, the theme indexes are preferably established for different types of management data, resource data, learning status data, and the like according to the analysis themes, the map layers are established according to the themes, and the data is loaded to the corresponding map layers through indexes. Specifically, a theme atlas is built according to analysis theme needs, and a map layer collection is built according to theme requirements. Data content corresponding to the map layers is determined for the map layers. Space and time conditions of the data are confirmed based on limiting factors of the themes. The databases are queried to obtained the corresponding data content by applying the space and time conditions, and space and time data and source data are loaded may layer by map layer to build map layers on the basis of the maps.

In other words, when the educational big data is used, different analysis requirements may be present, such as a statistical analysis of learner origins according to spatial range, time regularity and distribution state of learning behavior of learners, and so on. A corresponding analysis mode is required to be made and a distinct map layer is required to be built for each of the analysis requirements, and the map layer of each of the analysis requirements is presented on the basis of the maps.

(2-4) Visual properties and symbol patterns of the theme map layers are configured, and educational maps are formed. In this embodiment, after the map layers are confirmed, the visual properties and the corresponding symbol patterns in the visualization are preferably configured. In this embodiment, it is preferred that on one hand, color configurations for existing map layers may be accomplished by using an automatic color mapping principle. In an automatic color matching solution, color intervals of the map layers are automatically calculated based on the number of the map layers through selecting a color system. In an automatic color matching manner, different color systems are provided for selection. In another solution, a user may customize a color matching method as well. The user may customize and select the color of each map layer by him/herself and performs personalized configuration to the colors of the map layers.

In this embodiment, map layer symbols are used to present different data factors in the map layers, for example, expression of a position of a leaner in a table map layer, expression of a path of a learning process, expression of an administrative unit, and the like. Further, a map drawing principle is preferably applied, and a symbolized presentation method for a point subject, a line subject, and a plane subject is provided. Different from the general map drawing methods, in this embodiment, educational and teaching image symbols such as student images, learning images, cartoon images of the learning sources, etc. may be introduced for symbolized presentation of various objects, while symbols of other forms may also be introduced, such as an image customized by the user him/herself. Further, a series of image bases may also be built according to different age requirements, and at the same time, the image base suitable for each of the themes is built for theme classifications, so that symbolized expression of the matching is ensured. That is, a group of symbol images, such as a group of animal images, may be configured under such theme for each of the theme classifications, and such group of animal images may be presented on the theme map layer after such image group is selected.

That is, when map layer symbols are added by using the technical solution provided by this embodiment, on one hand, various types of selection manners are provided, so that the maps may be presented by diverse symbol images. On the other hand, correlation relationships among different symbols of the same object are required to be established, so that symbols of different forms of the unified object are prevented from being mismatched during switching.

(3) Various types of application modes are constructed on the basis of the map layers, and educational application modes and service models on the basis of a visual analysis of the maps are accomplished. In short, the teaching resources and the learning resources are closely related, and the full use of the teaching resources and the learning resources by users (educators or learners) is one of the prerequisites for improving the quality of teaching. For instance, an educator may make a reasonable allocation of the teaching resources based on a learner's learning status assessment, or the learner makes reasonable use of his/her own information based on the distribution of the teaching resources and the like. In this embodiment, based on a visual analysis of time and space distribution of the education management information, resource information, and so on, a visual analysis application mode of education decision-making supports on the basis of the time and space distribution of the maps is constructed. A visual application mode of autonomous learning on the basis of location retrieval is constructed for position locating in the personalized learning process. A visual analysis application mode of teaching evaluation on the basis of spatial statistics is constructed by using a learning space as a unit. An information extraction model on the basis of integration of multi-theme map layers is constructed, and effective extraction of the education management information, education resource information, and personal learning information is accomplished. A correlation analysis of the teaching resources and the learning resources is accomplished by applying an analysis method of a buffer region of points, lines, and planes, etc., and multi-theme and multi-level joint analysis and applications are finally accomplished.

Alternatively, when the map layers are viewed from a two-dimensional perspective, one map layer plane may be viewed as being formed by data on one map layer, and a three-dimensional structure is formed by multiple theme map layers arranged to be parallel to the base maps on the basis of the base maps. That is, the theme map layers are provided by horizontally loading data according to different analysis themes, and an analysis on the basis of a single theme map layer is horizontally performed as well, that is, the horizontal map layer data is extracted and analyzed. Correspondingly, all map layer data in a certain space region is extracted by fusing the theme map layers, which means that a vertical analysis is performed on the basis of the base maps, that is, vertical data is extracted and analyzed. One of the reasons of adopting such manner is that data on a certain location may be included in horizontal theme map layers (i.e., determined by the theme map layers confirmed by the analysis themes) and may also be included in the vertical space region (determined by the geotags of the data).

Figure 3:
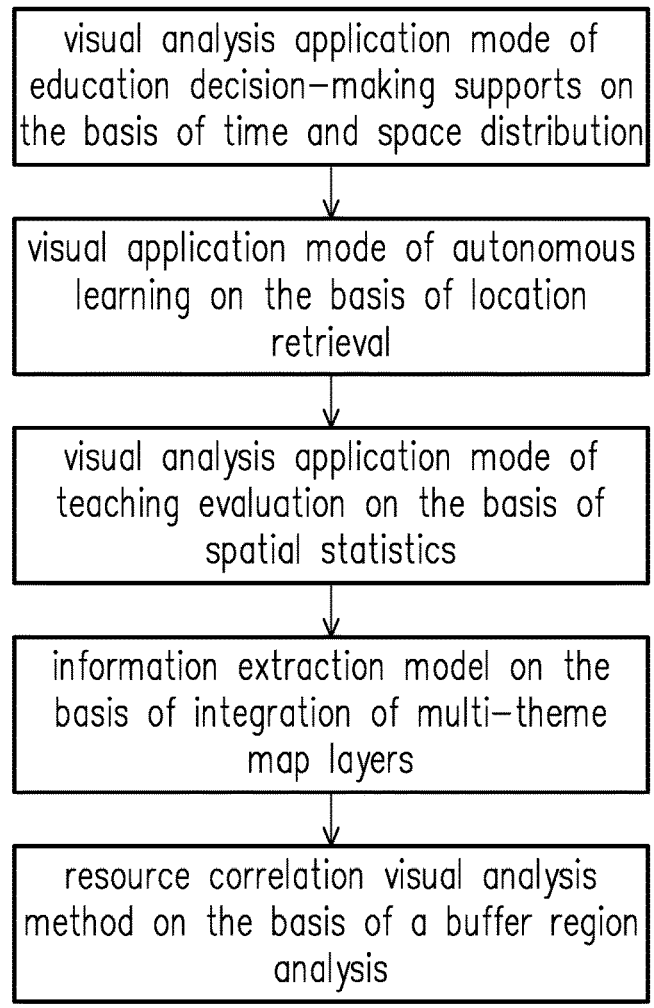
FIG. 3 is a flow chart of a visual analysis application mode and information extraction model on the basis of maps according to an embodiment of the disclosure.

As shown in FIG. 3, the following steps are included in step (3).

(3-1) A visual analysis application mode of education decision-making supports on the basis of the time and space distribution of the maps is constructed through a time and space visual method on the basis of the maps. In this embodiment, the foregoing effect is preferably accomplished through using the educational maps. First, basic maps acting as the base maps are loaded, such as administrative region maps of the corresponding regions, and cartographic legends and types may be applied for visualization. On the foregoing basis, theme data map layers are further loaded, and the theme map layers are superimposed onto the base maps for visual display. In this embodiment, customized types are preferably applied to the map layers. Finally, for the same theme, one map layer is established for each time node according to a time sequence. At the same time, an observation timeline is configured so that visual property of the map layer is controlled through the timeline. That is, a location of a moment on the timeline is changed, so that data information of such moment may be displayed.

In this embodiment, a cluster analysis is preferably established for the map layer under each of the time nodes, and a bounding box type is used for marking, lso that cluster resources are highlighted. In addition, the time sequence presentation process is preferably applied, so that intuitive and visual presentation may be obtained for the process of change in expression types over time. Finally, a current status of the existing data is accurately expressed by applying a method of time and space distribution presentation and is configured to act as auxiliary information in a decision-making process.

(3-2) A visual application mode of autonomous learning on the basis of location retrieval is constructed for a position in the personalized learning process. Specifically, in order to accomplish this process, a learner cognitive map is required to be built first, that is, the cognitive process is mapped into the maps, so that the geographic coordinates of the current cognitive location are obtained. A primitive object (i.e., a knowledge object) corresponding to a knowledge map where the current point is located is queried through applying a method of space point query. Next, a boundary of the knowledge object is obtained, and a space query is performed by applying a boundary polygon as a unit, so that all of the knowledge point data, resource data, individual learning status data, and so on related to the space is obtained. The knowledge point data, resource data, and learning status data is then classified, learned and unlearned knowledge points are clarified, and how well the learned knowledge points are learned are clarified. Knowledge points and resources required to be learned are further analyzed. The knowledge resources required to be learned are filtered and prioritized through analyzing the learning status of the existing learner, so that the learning resource most suitable for the current individual is obtained. The individual may make selection on the map page and then changes to the corresponding learning platform for online learning.

(3-3) A visual analysis application mode of teaching evaluation on the basis of spatial statistics is constructed with a learning unit acting as a core of a region. In this embodiment, learning units of different levels act as the basis, and a polygon boundary of each of the units is obtained. Such boundary is applied to retrieve learners, and learning evaluation results of the learners are obtained, that is, learning hours, learning resource content, and learning self-test results. Learning situations of the learners are calculated, a result index storage table is built, and incremental statistics and evaluation of different learning results are accomplished. According to the legend of the drawings, the forms of graphs and tables are selected to visually display the learning effect evaluation results of the current learning unit. In this embodiment, it is preferred that when the legend is relatively large, the graph form is selected and is displayed at the center of the unit region. Pie charts, column charts, and multidimensional mixed graphs may be selected for visualization as regards graphical display. When the legend of the drawings is excessively small, the table form may be used, and each of the evaluation results may be independently listed and displayed. The table is displayed through a dynamic and interactive form. Regardless of the graph or the table, dynamic presentation is applied to support the user to examine the details during the viewing process.

(3-4) A theme map layer fusing algorithm is built. An extraction model based on multi-theme map layer information is built to extract education management information, resource development information, and personal learning information. Specifically, the map layer fusing algorithm is applied, so that different map layer information is extracted. Polygon information of map layers of the base maps and data filtering factors in the map layers of the base maps are obtained through a map layer fusing extraction model, and a fusion background color is built by the filtering factors according to the rules of color fusion. Next, a color value is normalized for the data required to be fused in the superimpose map layer according to the status of the data on the basis of the fused color, and the color value and the base maps are fused, and map spots and colors are retained to act as the content to be extracted after the fusing operation. A vector boundary of the map spot is obtained for the map spot object after fusion is performed. The vector boundary and a fusion threshold are applied to re-retrieve data in the corresponding spatial range to obtain an original value of the information after fusion is performed, that is, a parameter used to express the corresponding information. Such parameter is configured for tutorial and recommendation learning.

(3-5) A correlation analysis model between the teaching resources and learning environment and the education and learning individuals is built through an analysis of the buffer region such as the points, lines, planes. In this way, a multi-theme, multi-subject, and multi-level joint analysis is accomplished. Specifically, a geographic information space analysis method is applied, and the knowledge points or the geographic coordinates of the location of the learner act as the basis to configure a plurality of radius building a point buffer region, and that a boundary of the buffer region is obtained. A space query is performed to theme application boundaries such as the learning resources, learning content, and learning personnel, so as to obtain related content in the buffer region and build space relationships between the current learning personnel or knowledge and the teaching resources, education content, and learning individuals. A time correlation analysis is then performed to perform a stage analysis of the current learning situations, and the time and space correlation of a corresponding learning stage is obtained.

Connections to different points of the current learning process are built, and line buffer regions are built with a predetermined fixed size as the radius, so that the boundary of the buffer region is obtained. Similar to the operational process of the point buffer region, a boundary polygon is applied to perform the space query, and situations of the corresponding teaching resources, teaching content, and learning individuals are obtained. A time sequence stage analysis is applied at the same time, and individual correlation of this region is obtained.

Establishment of a plane buffer region is made based on a polygon of learned content. A predetermined radius is applied to build a new buffer polygon, and after a polygon boundary is obtained, the space query is applied to and that related content in the region is obtained. Similar to the methods for the point buffer region and the line buffer region, the related analysis of different teaching resources, content, and learning individuals is accomplished.

Note that the methods for the point buffer region, the line buffer region, and the plane buffer region are suitable for map objects of different levels. That is, individual locations, individual learning experiences, and individual learning regions are expressed by applying map elements, and the same are suitable for education information management units including people, classes, or administrative units expressed by points. When the same object is applied in different levels, the object may be generalized into different map element units, and the difference lies in scales or ranges analyzed or selected for the object.

The method of the buffer region similarly includes space analysis operation to the buffer region for different application units, that is, a space relationship analysis of the buffer region after different administrative units are applied for the buffer region analysis, an analysis of overlapping areas or coverage areas of paths, and the like. These pieces of information are used to disclose overlapping features of policy impacts in different regions.

Figure 4:
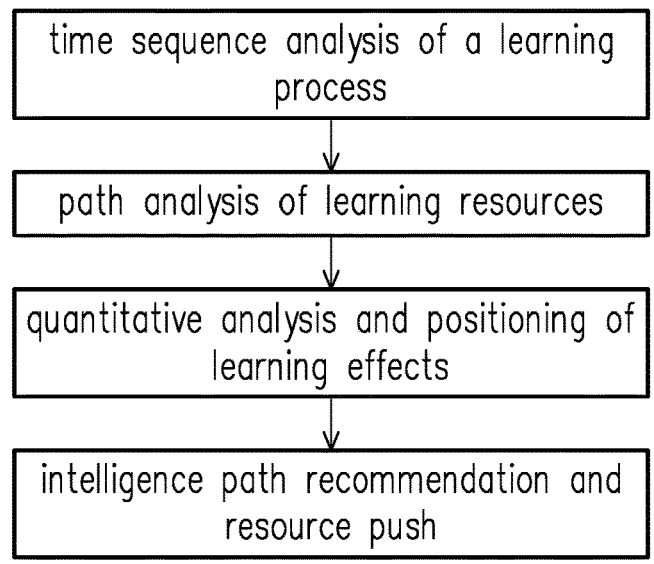
FIG. 4 is a flow chart of intelligence learning guidance and resource push according to an embodiment of the disclosure.

(4) A space and time analysis method is applied to perform a time sequence visual analysis of individual learning processes. An optimal path analysis method is applied to perform a path analysis of a learner learning path and learned resources, and an existing learned path mode is analyzed through a mode analysis method. A learning effect quantitative analysis model is created, and a location of a learner and learning resource preference of the learning are located according to an existing learning time sequence and path. An intelligence learning guidance model is created, optimized review guides for existing learning content are introduced, and path recommendations and resource push for unlearned content are established. As shown in FIG. 4, the following steps are included in step (4).

(4-1) A map time sequence analysis method is applied, time sequence visualization of individual learning processes is performed, a time sequence analysis method of the learning resources and learning effects is built, and real-time assessment of the learning process is performed. A personal record number is used as a search condition to query all data related to personal learning obtaining the number from the database, and such data includes each learning location, content, and learning time. According to the location coordinates, the data is depicted to a corresponding point of the map, and different points are connected by lines in order according to the time sequence. A learning effect display pattern is built according to learning resources and learning evaluation results of learning effects of each location. Learning effect evaluation parameters are calculated according to the relationships among high-quality parameters of the learning resources, situations of test scores, and time length of learning, and pattern presentations are unified according to the parameters. A fuzzy evaluation model is built, and in this embodiment, such model is preferably built based on the steps as follows.

A learning effect evaluation object is configured to be P, a factor set thereof is configured to be $U=\{u_1, u_2, u_3\}$, factor content includes the learning resource parameters, test scores, and learning time length, and an evaluation level set is $V=\{v_1, v_2, v_3\}$. Fuzzy evaluation of each factor in U is performed according to a level indicator in the evaluation set, and an evaluation matrix is obtained:

$$R = \begin{bmatrix} r_{11} & r_{12} & r_{13} \\ r_{21} & r_{22} & r_{23} \\ r_{31} & r_{32} & r_{33} \end{bmatrix}$$

herein, $r_{ij}$ indicates the degree of membership of $u_i$ with respect to $v_j$.

An importance weight for each factor is established, denoted as $A=\{a_1, a_2, a_3\}$ to satisfy $\Sigma_{i=1}^{n} a_i=1$. After composition and normalization are made, $B=\{b_1, b_2, b_3\}$ is obtained, which is expressed as an evaluation matrix of P.

(4-2) A path analysis method is applied, and a path analysis is performed to the learning paths and the learning resources thereof. A path clustering model is built to analyze features of learning process paths in the existing learning process Specifically, on the basis of learners, learning process data of each learner is retrieved, and a learning process path of the learner is depicted by the time sequence process of the learner. Learning processes for different knowledge points in different learning processes are obtained. The knowledge points required to be analyzed are selected, and space between knowledge points including a box or space query rectangle is built. This rectangle is applied to query all relevant line segments in this interval, i.e., the learning path of the learner. A path segment cluster analysis is applied, and paths which are completely identical are aggregated first. Then, the line segment with the greatest similarity in the line segments are queried. A similarity threshold is set to α, that is, when the difference of the line segments is greater than α, the line segments are divided into different classes. α is a predetermined value. A number of the paths is obtained after clustering, each path is a learning process feature.

(4-3) A quantitative analysis model of learning effects is preferably built. Through learning process path features and resource evaluation results, subsequent learned paths and related resources are recommended. Preferably, similar to the establishment of the learning time length evaluation mechanism of the learning resources, it is considered that with the same learning resource, if the learning time is longer, the resource content is then richer and may better facilitate learning. For each learning resource, the learning time length of the learner is accumulated and calculated. A learned time length parameter is obtained, and importance of the learned resource is described.

In addition, a recommendation index is established for each learning resource, and such index is used to describe subsequent recommendation priority of this resource. A calculation formula of the recommendation index is provided as follows:

$$\partial = (\alpha T + \beta C + \varepsilon H)$$

herein, $\partial$ represents the recommendation index, T represents the learning time length, α is a weight coefficient, C represents a content difficulty coefficient, β represents a weight coefficient, H represents a resource quality evaluation parameter, ε represents a weight parameter, and a sum of the weight parameters is 1.

$$\alpha + \beta + \varepsilon = 1$$

A relationship between the resources and the learning paths is built. The learning order of different resources and the order of the same learning location in the same path are described, so that a more favorable learning path is guided.

(4-4) A learner personalization status is introduced. An intelligence learning guidance mode is established, and path navigation and resource push are accomplished based on location and time sequence statuses. Specifically, a learning process path is established for the leaner, and a matching relationship with a learning path of a subsequent unlearned knowledge point is built, so as to find the learning path most suitable for the learner. The learning status, learning position, and evaluation results of the current learner are obtained, and the following recommendation learning order of the knowledge points and the corresponding learning resources are calculated according to learning ability assessment results of the current learner. When the learner is learning, according to a learning completion status and location changes of the learner, the corresponding learning resources suitable for the learner's personalized requirements are pushed.

Figure 5:
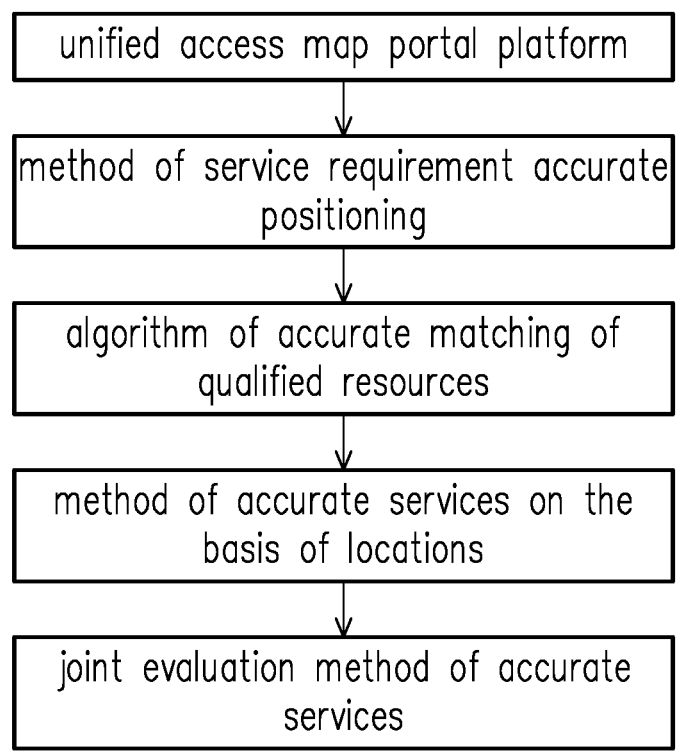
FIG. 5 is a flow chart of an accurate service and joint evaluation method according to an embodiment of the disclosure.

(5) A unified access portal platform of the educational big data maps is built, and an application mode based on the unified portal for all users is accomplished. User service requirements are parsed, and accurate location-based services positioning is built. The content of the service requirements is decomposed, and accurate matching of qualified resources is accomplished by applying the space query and analysis method. Location-based visual analysis services are accomplished according to accurate positioning of the service requests. Finally, a user service satisfaction status is obtained, and service evaluation is accomplished by applying a joint evaluation model. As shown in FIG. 5, the following steps are included in step (5).

(5-1) A unified access platform based on a map portal is constructed, and a unified portal access manner for all users is accomplished. Specifically, a service platform based on the maps acting as the base maps is built. All users access resources through the same portal to establish different user rights, and resource permissions for different rights access are distinguished. A learner may access learning resources merely as well as personal related learning paths, learning results, and the like.

(5-2) User needs are parsed, and accurate location-based service needs positioning is built. Specifically, service classifications are defined, and the education management information service and personal learning application service are distinguished. Hierarchical and progressive service analyses and clear operations for different service classifications are built. Data display, information extraction, development analysis, and so on are distinguished for the education management information service, and specific content of the service is positioned by clearly-defining the purpose of the service, and the visual operation is customized. Learning behaviors and information browsing behaviors are defined for individual learning application services, and content of data services are positioned through different behaviors, and a visual operation process is customized.

(5-3) Accurate location-based resource matching is accomplished. Specifically, after a specific service is clearly defined, a data retrieval space range is confirmed based on the current location of the service or a spatial range required to be processed by the service. A spatial range for the query is generated, that is, a query rectangle. The spatial range is used as an input condition, and a content data map layer corresponding to the service is selected as an object for performing spatial retrieval, and data is then obtained. Filtering conditions are added or application rules are applied for the retrieved data for sorting. Matching queues of service resources are generated and displayed in sequence for users to select.

(5-4) Location-based visual analysis services are applied. Specifically, after resource matching is completed, visual features based on the location where the resources are located are configured, and location-based visualization is accomplished through interactive selection. In a certain location, after obtaining the matching resources, the user selects visual rules according to needs to visually display a large number of resources. A class visualization service is managed, and display of time and space distribution and display of information of data and information are accomplished. A personal learning visual service providing a variety of learning tools is provided, and online learning is accomplished.

(5-5) A user service status is obtained, and the joint evaluation model is applied to accomplish service accuracy evaluation. Specifically, the joint evaluation model is established through recording the operation process required by user services, returning results, service duration, and user follow-up operation content, so the service accuracy evaluation is accomplished.

People killed in the art should be able to easily understand that the above description is only preferred embodiments of the disclosure and is not intended to limit the disclosure. Any modifications, equivalent replacements, and modifications made without departing from the spirit and principles of the disclosure should fall within the protection scope of the disclosure.

What is claimed is:

1. A method for analyzing educational big data on the basis of maps, wherein the method comprises:
   acquiring and classifying educational resource data and storing the educational resource data into databases according to certain data structures, wherein the educational resource data are divided into teaching resources and learning resources;
   obtaining location coordinates at the time of learning by using GPS in a mobile learning system or determining through an IP address in an online learning system when collecting the educational resource data, acquiring geotags of the educational resource data by applying a method of parsing place names, generating geographic coordinates through using a method of knowledge map mapping, adapting hierarchical information of application knowledge, establishing a map mapping, obtaining a mapped geographic location of the educational resource data, and-defining geographical forms and/or locations according to the geotags, constructing theme map layers for each of analysis themes, classifying and indexing the data according to the analysis themes, loading the data to the corresponding theme map layers, and superimposing the theme map layers onto base maps to form data maps;
   analyzing the data of the theme map layers according to the analysis themes and acquiring theme analysis results; extracting the data of the multiple theme map layers in target regions according to the geotags of the data, fusing the data, and acquiring region analysis results; wherein according to the analysis themes, each of the multiple theme map layers is subjected to horizontal loading to extract horizontal data for analysis; and in a certain target region, all theme map layers are fused and subjected to vertical extraction on the basis of a corresponding base map to extract vertical data for analysis;
   analyzing users according to learning time sequences and/or learning paths and acquiring learning preference of the users; and
   combining the learning preference of the users according to content of user requests, searching the region analysis results in response to the user requests, and presenting request results on the maps;
   wherein the step of "analyzing users according to learning time sequences and/or learning paths and acquiring learning preference of the users" comprises:
   performing a time sequence analysis of learning resources and learning effects according to the geotags of the data and acquiring learning resource evaluation results by means of a fuzzy evaluation model; wherein the fuzzy evaluation model is built through steps of: configuring a learning effect evaluation object as P with a factor set of U={$u_1$, $u_2$, $u_3$}, wherein $u_1$, $u_2$ and $u_3$ respectively represent learning source parameter, test score and learning time length; constructing an evaluation level set V={$v_1$, $v_2$, $v_3$}; and performing fuzzy evaluation on each factor in U according to each level indicator in the V to obtain an evaluation matrix expressed as follows:

$$R = \begin{bmatrix} r_{11} & r_{12} & r_{13} \\ r_{21} & r_{22} & r_{23} \\ r_{31} & r_{32} & r_{33} \end{bmatrix};$$

wherein $r_{ij}$ indicates a membership degree of $u_i$ with respect to $v_j$;
   performing a path analysis of the learning paths and/or learning resources and acquiring learning path features;
   generating and planning for at least one learning path and/or generating and recommending the learning resources according to the learning path features and/or the learning resource evaluation results based on a recommendation index, wherein the recommendation index is established for each learning resource to describe a recommendation priority of this learning resource, calculated by: $\partial=(\alpha T+\beta C+\varepsilon H)$; wherein $\partial$ represents the commendation index, T represents the learning time length, $\alpha$ represents a first weight coefficient, C represents a content difficulty coefficient, $\beta$ represents a second weight coefficient, H represents a resource quality evaluation parameter, ε represents a third weight coefficient, and α+β+ε=1; and sorting real-time learning path planning and/or learning resource recommendation by combining a real-time location and a time sequence status of the user according to personalized selection of the user.

2. The method for analyzing the educational big data on the basis of the maps as claimed in claim 1 further comprising:

establishing theme indexes according to analysis themes and loading the data to different theme map layers through the indexes; and configuring and loading a visual property and/or a symbol pattern for each theme layer and forming the data maps.

3. The method for analyzing the educational big data on the basis of the maps according to claim 1 further comprising:

loading the theme map layers to the base maps for visual presentation, creating a plurality of sub map layers of the theme map layers according to time sequence nodes, configuring observation timelines to control visual properties of the sub map layers, and acquiring the theme analysis results of the theme map layers;

loading the base maps, mapping target data into the base maps according to geographic coordinates, acquiring and classifying all data within a boundary range according to the boundary range of the current target data, and filtering data matched with the target data and displaying the data on the maps;

dividing an educational map into a plurality of learning units, loading data of each learning unit, counting learning data of each user in the current learning unit, performing a single analysis or a cross analysis according to data categories, and performing learning evaluation according to analysis results;

fusing the theme map layers to accomplish information extraction of the multiple theme map layers, acquiring and fusing data information of the target regions on different theme map layers at a same time, analyzing the fused data in the target regions, and obtaining analysis results of the target regions; and determining a buffer region by utilizing geographic coordinates of the target data, performing data query of different theme map layers for the buffer region, establishing a space relationship between target data and different theme map layers, determining a space and time relationship between target data and different theme map layer data according to time sequence changes.

4. The method for analyzing the educational big data on the basis of the maps according to any one of claim 1 further comprising:

parsing user requests and extracting accessible theme map layers and data according to users' access rights and locations from which the requests are made; and searching and matching the theme map layers and data in combination with access request content and visualizing matching results on the maps.

5. A system for analyzing educational big data on the basis of maps, adapted to an electronic apparatus, wherein the system comprises:

a data acquiring module configured to acquire and classify educational resource data and store the educational resource data into databases according to certain data structures, wherein the educational resource data are divided into teaching resources and learning resources;

a map constructing module configured to obtain location coordinates at the time of learning by using GPS in a mobile learning system or determining through an IP address in an online learning system when collecting the educational resource data, acquire geotags of the educational resource data, generating geographic coordinates through using a method of knowledge map mapping, adapting hierarchical information of application knowledge, establishing a map mapping, and obtaining a mapped geographic location of the educational resource data, wherein the map constructing module comprises a geotag module, the geotag module configured to acquire the geotags of the educational resource data by applying a method of parsing place names and define geographical forms and/or locations according to the geotags, the map constructing module further configured to construct theme map layers for each analysis theme, classify and index the data according to the analysis themes, load the data to the corresponding theme map layers, and superimpose the theme map layers onto base maps to form data maps;

a resource correlation module configured to analyze data of the theme map layers according to the analysis themes and acquire theme analysis results; extract the data of the multiple theme map layers in target regions according to the geotags of the data, fuse the data, and acquire region analysis results; wherein according to the analysis themes, each of the multiple theme map layers is subjected to horizontal loading to extract horizontal data for analysis; and in a certain target region, all theme map layers are fused and subjected to vertical extraction on the basis of a corresponding base map to extract vertical data for analysis;

a resource recommendation module configured to analyze users according to learning time sequences and/or learning paths and acquire learning preference of the users; and a user access module configured to combine the learning preference of the users according to content of user requests, search the region analysis results in response to the user requests, and present request results on the maps;

wherein the resource recommendation module comprises:

a time sequence analysis module configured to perform a time sequence analysis of learning resources and learning effects according to the geotags of the data and acquire learning resource evaluation results by means of a fuzzy evaluation model; wherein the fuzzy evaluation model is built through steps of: configuring a learning effect evaluation object as P with a factor set of U={$u_1$, $u_2$, $u_3$}, wherein $u_1$, $u_2$ and $u_3$ respectively represent learning source parameter, test score and learning time length; constructing an evaluation level set V={$v_1$, $v_2$, $v_3$}; and performing fuzzy evaluation on each factor in U according to each level indicator in the V to obtain an evaluation matrix expressed as follows:

$$R = \begin{bmatrix} r_{11} & r_{12} & r_{13} \\ r_{21} & r_{22} & r_{23} \\ r_{31} & r_{32} & r_{33} \end{bmatrix};$$

wherein $r_{ij}$ indicates a membership degree of $u_i$ with respect to $v_j$;

a path analysis module configured to perform a path analysis of the learning paths and/or learning resources and acquire learning path features;

a resource evaluation module configured to generate and plan for at least one learning path and/or generate and recommend the learning resources according to the learning path features and/or the learning resource evaluation results based on a recommendation index, wherein the recommendation index is established for each learning resource to describe a recommendation priority of this learning resource, calculated by: $\partial=(\alpha T+\beta C+\epsilon H)$; wherein $\partial$ represents the commendation index, T represents the learning time length, $\alpha$ represents a first weight coefficient, C represents a content difficulty coefficient, $\beta$ represents a second weight coefficient, H represents a resource quality evaluation parameter, $\epsilon$ represents a third weight coefficient, and $\alpha+\beta+\epsilon=1$; and an intelligence learning guidance module configured to sort real-time learning path planning and/or learning resource recommendation by combining a real-time location and a time sequence status of the user according to personalized selection of the user.

6. The system for analyzing the educational big data on the basis of the maps according to claim 5, wherein the map constructing module comprises:

a theme indexing module configured to establish theme indexes according to analysis themes and load the data to different theme map layers through the indexes; and a map visualization module configured to configure and load a visual property and/or a symbol pattern for each theme layer and form the data maps.

7. The system for analyzing the educational big data on the basis of the maps according to claim 5, wherein the resource correlation module comprises:

a map layer analysis module configured to load the theme map layers to the base maps for visual presentation, create a plurality of sub map layers of the theme map layers according to time sequence nodes, configure observation timelines to control visual properties of the sub map layers, and acquire the theme analysis results of the theme map layers;

a boundary filtering module configured to load the base maps, map target data into the base maps according to geographic coordinates, acquire and classify all data within a boundary range according to the boundary range of the current target data, and filter data matched with the target data and display the data on the maps;

a unit evaluation module configured to divide an educational map into a plurality of learning units, load data of each learning unit, count learning data of each user in the current learning unit, perform a single analysis or a cross analysis according to data categories, and perform learning evaluation according to analysis results;

a map layer fusing module configured to fuse the theme map layers to accomplish information extraction of the multiple theme map layers, acquire and fuse data information of the target regions on different theme map layers at a same time, analyze the fused data in the target regions, and obtain analysis results of the target regions; and a correlation analysis module configured to determine a buffer region by utilizing geographic coordinates of the target data, perform data query of different theme map layers for the buffer region, establish a space relationship between target data and different theme map layers, determine a space and time relationship between target data and different theme map layer data according to time sequence changes.

8. The system for analyzing the educational big data on the basis of the maps according to claim 5, wherein the user access module comprises:

a data parsing module configured to parse user requests and extract accessible theme map layers and data according to users' access rights and locations from which the requests are made; and a resource matching module, configured to search and match the theme map layers and data in combination with access request content and visualize matching results on the maps.

9. The method for analyzing the educational big data on the basis of the maps according to claim 2 further comprising:

loading the theme map layers to the base maps for visual presentation, creating a plurality of sub map layers of the theme map layers according to time sequence nodes, configuring observation timelines to control visual properties of the sub map layers, and acquiring the theme analysis results of the theme map layers;

loading the base maps, mapping target data into the base maps according to geographic coordinates, acquiring and classifying all data within a boundary range according to the boundary range of the current target data, and filtering data matched with the target data and displaying the data on the maps;

dividing an educational map into a plurality of learning units, loading data of each learning unit, counting learning data of each user in the current learning unit, performing a single analysis or a cross analysis according to data categories, and performing learning evaluation according to analysis results;

fusing the theme map layers to accomplish information extraction of the multiple theme map layers, acquiring and fusing data information of the target regions on different theme map layers at a same time, analyzing the fused data in the target regions, and obtaining analysis results of the target regions; and determining a buffer region by utilizing geographic coordinates of the target data, performing data query of different theme map layers for the buffer region, establishing a space relationship between target data and different theme map layers, determining a space and time relationship between target data and different theme map layer data according to time sequence changes.

10. The method for analyzing the educational big data on the basis of the maps according to claim 2 further comprising:

performing a time sequence analysis of learning resources and learning effects according to the geotags of the data and acquiring learning resource evaluation results;

performing a path analysis of the learning paths and/or learning resources and acquiring learning path features;

generating and planning for at least one learning path and/or generating and recommending the learning resources according to the learning path features and/or the learning resource evaluation results; and sorting real-time learning path planning and/or learning resource recommendation by combining a real-time location and a time sequence status of the user according to personalized selection of the user.

11. The method for analyzing the educational big data on the basis of the maps according to claim 3 further comprising:

performing a time sequence analysis of learning resources and learning effects according to the geotags of the data and acquiring learning resource evaluation results;

performing a path analysis of the learning paths and/or learning resources and acquiring learning path features;

generating and planning for at least one learning path and/or generating and recommending the learning resources according to the learning path features and/or the learning resource evaluation results; and sorting real-time learning path planning and/or learning resource recommendation by combining a real-time location and a time sequence status of the user according to personalized selection of the user.

12. The method for analyzing the educational big data on the basis of the maps according to claim 2 further comprising:

parsing user requests and extracting accessible theme map layers and data according to users' access rights and locations from which the requests are made; and searching and matching the theme map layers and data in combination with access request content and visualizing matching results on the maps.

13. The method for analyzing the educational big data on the basis of the maps according to claim 3 further comprising:

parsing user requests and extracting accessible theme map layers and data according to users' access rights and locations from which the requests are made; and searching and matching the theme map layers and data in combination with access request content and visualizing matching results on the maps.

14. The method for analyzing the educational big data on the basis of the maps according to claim 1 further comprising:

parsing user requests and extracting accessible theme map layers and data according to users' access rights and locations from which the requests are made; and searching and matching the theme map layers and data in combination with access request content and visualizing matching results on the maps.

15. The system for analyzing the educational big data on the basis of the maps according to claim 6, wherein the resource correlation module comprises:

a map layer analysis module configured to load the theme map layers to the base maps for visual presentation, create a plurality of sub map layers of the theme map layers according to time sequence nodes, configure observation timelines to control visual properties of the sub map layers, and acquire the theme analysis results of the theme map layers;

a boundary filtering module configured to load the base maps, map target data into the base maps according to geographic coordinates, acquire and classify all data within a boundary range according to the boundary range of the current target data, and filter data matched with the target data and display the data on the maps;

a unit evaluation module configured to divide an educational map into a plurality of learning units, load data of each learning unit, count learning data of each user in the current learning unit, perform a single analysis or a cross analysis according to data categories, and perform learning evaluation according to analysis results;

a map layer fusing module configured to fuse the theme map layers to accomplish information extraction of the multiple theme map layers, acquire and fuse data information of the target regions on different theme map layers at a same time, analyze the fused data in the target regions, and obtain analysis results of the target regions; and a correlation analysis module configured to determine a buffer region by utilizing geographic coordinates of the target data, perform data query of different theme map layers for the buffer region, establish a space relationship between target data and different theme map layers, determine a space and time relationship between target data and different theme map layer data according to time sequence changes.

16. The system for analyzing the educational big data on the basis of the maps according to claim 6, wherein the resource recommendation module comprises:

a time sequence analysis module configured to perform a time sequence analysis of learning resources and learning effects according to the geotags of the data and acquire learning resource evaluation results;

a path analysis module configured to perform a path analysis of the learning paths and/or learning resources and acquire learning path features;

a resource evaluation module configured to generate and plan for at least one learning path and/or generate and recommend the learning resources according to the learning path features and/or the learning resource evaluation results; and an intelligence learning guidance module configured to sort real-time learning path planning and/or learning resource recommendation by combining a real-time location and a time sequence status of the user according to personalized selection of the user.

17. The system for analyzing the educational big data on the basis of the maps according to claim 7, wherein the resource recommendation module comprises:

a time sequence analysis module configured to perform a time sequence analysis of learning resources and learning effects according to the geotags of the data and acquire learning resource evaluation results;

a path analysis module configured to perform a path analysis of the learning paths and/or learning resources and acquire learning path features;

a resource evaluation module configured to generate and plan for at least one learning path and/or generate and recommend the learning resources according to the learning path features and/or the learning resource evaluation results; and an intelligence learning guidance module configured to sort real-time learning path planning and/or learning resource recommendation by combining a real-time location and a time sequence status of the user according to personalized selection of the user.

18. The system for analyzing the educational big data on the basis of the maps according to claim 6, wherein the user access module comprises:

a data parsing module configured to parse user requests and extract accessible theme map layers and data according to users' access rights and locations from which the requests are made; and a resource matching module configured to search and match the theme map layers and data in combination with access request content and visualize matching results on the maps.

19. The system for analyzing the educational big data on the basis of the maps according to claim 7, wherein the user access module comprises a data parsing module configured to parse user requests and extract accessible theme map layers and data according to users' access rights and locations from which the requests are made; and a resource matching module configured to search and match the theme map layers and data in combination with access request content and visualize matching results on the maps.

20. The system for analyzing the educational big data on the basis of the maps according to claim 5, wherein the user access module comprises:

a data parsing module configured to parse user requests and extract accessible theme map layers and data according to users' access rights and locations from which the requests are made; and a resource matching module configured to search and match the theme map layers and data in combination with access request content and visualize matching results on the maps.

* * * * *